United States Patent
Han et al.

(10) Patent No.: US 7,428,271 B2
(45) Date of Patent: Sep. 23, 2008

(54) NETWORK DEVICE AND DATA TRANSMISSION METHOD FOR EFFICIENT DATA TRANSMISSION AND RECEPTION IN MOBILE AD HOC NETWORK ENVIRONMENT

(75) Inventors: Ji-yon Han, Seoul (KR); A-young Ji, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 624 days.

(21) Appl. No.: 10/889,185

(22) Filed: Jul. 13, 2004

(65) Prior Publication Data

US 2005/0013269 A1    Jan. 20, 2005

(30) Foreign Application Priority Data

Jul. 15, 2003    (KR)    ............... 10-2003-0048314

(51) Int. Cl.
    *H04L 27/00* (2006.01)
(52) U.S. Cl. ...................................... 375/316
(58) Field of Classification Search ................ 375/242, 375/316, 358; 370/351, 355, 356, 395.31, 370/395.32, 328
    See application file for complete search history.

(56) References Cited

U.S. PATENT DOCUMENTS

| | | | |
|---|---|---|---|
| 6,016,306 A | | 1/2000 | Le Boudec et al. |
| 6,813,272 B1 * | | 11/2004 | An et al. ................. 370/395.21 |
| 7,068,600 B2 * | | 6/2006 | Cain ........................ 370/230.1 |
| 2002/0080888 A1 * | | 6/2002 | Shu et al. ................. 375/295 |
| 2004/0015689 A1 * | | 1/2004 | Billhartz ................... 713/156 |

FOREIGN PATENT DOCUMENTS

| | | |
|---|---|---|
| EP | 0 889 609 A1 | 1/1999 |
| JP | 9-504671 A | 5/1997 |
| JP | 09-233467 A | 9/1997 |
| JP | 2003-179580 A | 6/2000 |
| JP | 2001-211202 A | 8/2001 |
| JP | 2001-274861 A | 10/2001 |
| JP | 2003-008588 A | 1/2003 |
| KR | 2001-003353 A | 1/2001 |
| KR | 2003-0026109 A | 3/2003 |
| WO | WO 00/39967 A2 | 7/2000 |
| WO | WO 02/51148 A1 | 6/2002 |
| WO | WO 03/053040 A2 | 6/2003 |

OTHER PUBLICATIONS

Japanese Office Action dated Jul. 4, 2006 issued in corresponding Japanese Patent Application No. 2004-93403.
Chinese Office Action issued May 9, 2007 in corresponding Chinese Application No. 200410069630.0.

* cited by examiner

*Primary Examiner*—Sam K Ahn
(74) *Attorney, Agent, or Firm*—Sughrue Mion, PLLC

(57) ABSTRACT

A network device and data transmission method for efficient data transmission and reception in a mobile ad hoc network environment. The mobile ad hoc network device includes an encoder for receiving multimedia signals and encoding the received signals depending on predetermined network information in the mobile ad hoc network environment, a database unit for storing the received multimedia signals, a network interface unit for receiving the network information and sending the multimedia signals encoded by the encoder, and a control unit for causing the network information received from the network interface unit to be stored in the database unit and allowing the encoder to perform its encoding operation depending on the received network information.

13 Claims, 6 Drawing Sheets

| Node | Bandwidth | Delay | LinkQuality |
|------|-----------|-------|-------------|
| 1 | | | |
| 2 | | | |
| .... | | | |
| 7 | | | |

| Topology Control |||
|---|---|---|
| Dest_Node | Last_Node | Resource Status Value (Bandwidth, Delay, LinkQuality) |
| 1 | 3 | (100, 2, 0.9) |
| 2 | 3 | (120, 1, 0.8) |
| ... | | |

FIG. 9

| FrameRate | Pbetweeni | Required_BW |
|---|---|---|
| 20 | 1 | 200 |
|  | 5 | 150 |
| 15 | 1 | 130 |
|  | 5 | 100 |
| ... | ... | ... |

NETWORK DEVICE AND DATA TRANSMISSION METHOD FOR EFFICIENT DATA TRANSMISSION AND RECEPTION IN MOBILE AD HOC NETWORK ENVIRONMENT

BACKGROUND OF THE INVENTION

This application claims the priority of Korean Patent Application No. 10-2003-0048314 filed on Jul. 15, 2003 in the Korean Intellectual Property Office, the disclosure of which is incorporated herein in its entirety by reference.

1. Field of Invention

The present invention relates to multimedia data transmission through a network, and more particularly, to a network device and data transmission method for efficiently transmitting multimedia data between nodes in a mobile ad hoc network (hereinafter, referred to as 'MANET') environment.

2. Description of the Related Art

Generally, since multimedia data such as audio and video data (hereinafter, referred to as 'AV data') require a lot of bandwidth, efficient data transmission between a data-sending party and a data-receiving party through a network may be achieved by means of a method of measuring currently available bandwidth and then changing an AV data transmission mode according to the measured bandwidth. A more detailed description of such a method will be made with reference to FIGS. 1 and 2.

FIG. 1 is an exemplary view schematically illustrating a conventional video transmission system in a network. The system comprises a video compression/file generation unit 100, a video server 110, and at least one video client 130. The video compression/file generation unit 100 receives raw video data and constructs the received data in multiple levels that in turn are encoded according to different data compression rates and then stored as files, respectively. In a case where the video client 130 requests video data transmission, the video server 110 measures the bandwidth available in a network 120 and selects a level corresponding to the measured bandwidth from the video compression/file generation unit 100. Then, the video server sends video data compressed with the selected level to the video client 130.

FIG. 2 is an exemplary view specifically illustrating the configuration of the video server 110 shown in FIG. 1. The video server 110 comprises a receiving unit 112 for receiving the compressed video data from the video compression/file generation unit 100; a transmission unit 114 for sending data received from the receiving unit 112 to the network 120 and measuring bandwidth of the network 120; and a control unit 116 for selecting the level according to the measured bandwidth. The transmission unit 114 periodically measures bandwidth even during data transmission. The bandwidth measurement is made based on end-to-end measurement, i.e. server-to-client measurement and uses a data transmission rate or data receiving rate. The data transmission rate denotes the number of bytes sent for a given response time period, whereas the data receiving rate denotes the number of bytes received for a given response time period. If there is a change in bandwidth during the periodic measurement of the bandwidth by the transmission unit 114, the control unit 116 selects a level corresponding to the measured bandwidth for the receiving unit 112, and the receiving unit 112 extracts a compressed video file corresponding to the selected level from the video compression/file generation unit 100 and then sends the extracted file to the transmission unit 114.

The data transmission method illustrated in FIGS. 1 and 2 may be efficient in a case where data transmission channels are fixed in the same manner as a wired network or where the positions of network devices using the data transmission channels are stationary. However, it may be difficult to apply the above method to cases where the status of a transmission channel or network is greatly changed as in a MANET environment. That is, a network terminal constituting a MANET requires a lot of additional resources due to limitations on processor performance, memory, power supply and the like in order to compress raw AV data with various levels and store the compressed AV data. Further, if only the bandwidth of the network is measured to select the compression level for the data transmission, it is difficult for a user to obtain satisfactory AV data in a MANET environment of which the status such as topology, time delay and receiving intensity dynamically varies. Accordingly, there is a need for an efficient AV data transmission method suitable for a MANET environment.

SUMMARY OF THE INVENTION

The present invention addresses the problems in the related art. An aspect of the present invention is to provide a method of efficiently transmitting AV data with limited resources through periodic detection of dynamic status changes by incorporating information on the MANET status into routing information without defining an additional packet format, and through the use of information on the detected status changes.

In order to accomplish the above aspect, a network device for efficient data transmission and reception in a mobile ad hoc network environment consistent with one embodiment of the present invention comprises an encoder for encoding multimedia data depending on predetermined network information; and a network interface for receiving the network information and sending the multimedia data encoded by the encoder. At this time, the network information is received in a state where it is contained in predetermined routing messages that are periodically transmitted and received.

Consistent with an embodiment of the present invention, the network information comprises information on bandwidth available in the mobile ad hoc network, or information on link quality between a data sending node and a data receiving node in the mobile ad hoc network. At this time, the encoder comprises a first coding unit for encoding the received multimedia data, and a second coding unit for coding the data, which have been encoded by the first coding unit, depending on the information on the link quality received through the network.

Meanwhile, the mobile ad hoc network device further comprises a control unit operating in such a manner that upon receipt of a packet retransmission request message, the requested packet is retransmitted when a value obtained by adding a current time to a resource value of time delay of a node that has sent the message, is smaller than the reproduction time for the requested packet.

Furthermore, in order to accomplish the above aspect, an efficient data transmission and reception method in a mobile ad hoc network environment consistent with another embodiment of the present invention comprises the first step of collecting routing information and resource information for nodes constituting a mobile ad hoc network; the second step of determining a method of encoding multimedia data by using the collected information; and the third step of encoding the multimedia data with the method determined in the second step and sending the encoded multimedia data. At this time, the first step comprises the step of causing the information to be contained in routing messages that are periodically transmitted and received, and extracting and collecting the information upon receipt of the routing messages.

Consistent with the present invention, the information comprises information on bandwidth available in the mobile ad hoc network. At this time, the second step comprises the step of making a determination such that the multimedia data can be encoded with different data compression rates depending on the bandwidth.

Consistent with an embodiment of the present invention, the information comprises information on link quality between a data sending node and a data receiving node in the mobile ad hoc network. At this time, the second step comprises the first coding step of encoding the multimedia data, and the second coding step of coding the data, which have been encoded in the first coding step, depending on the information on the link quality.

BRIEF DESCRIPTION OF THE DRAWINGS

The above and other aspects and features of the present invention will become apparent from the following description of exemplary embodiments given in conjunction with the accompanying drawings, in which:

FIG. 9 is an exemplary view showing a correlation between factors of multimedia data encoding and bandwidth associated therewith.

DETAILED DESCRIPTION OF THE INVENTION

Hereinafter, an efficient data transmission and reception method in a mobile ad hoc network environment consistent with an embodiment of the present invention will be described with reference to the accompanying drawings. Meanwhile, since each terminal functions as both a server and a client in the MANET environment, the following description of the present invention will be made on the assumption that a terminal requesting AV data is a client and a terminal providing AV data is a server.

Figure 1:
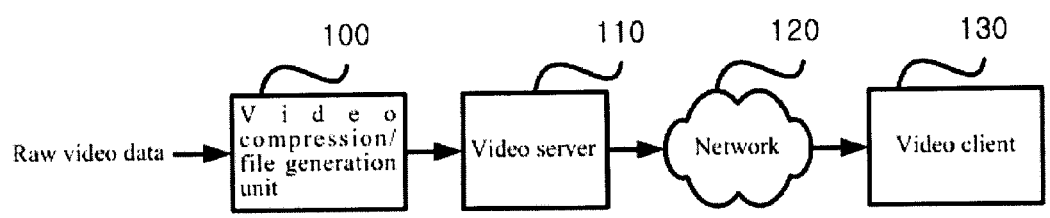
FIG. 1 is an exemplary view schematically illustrating a conventional video transmission system in a network.
Figure 2:
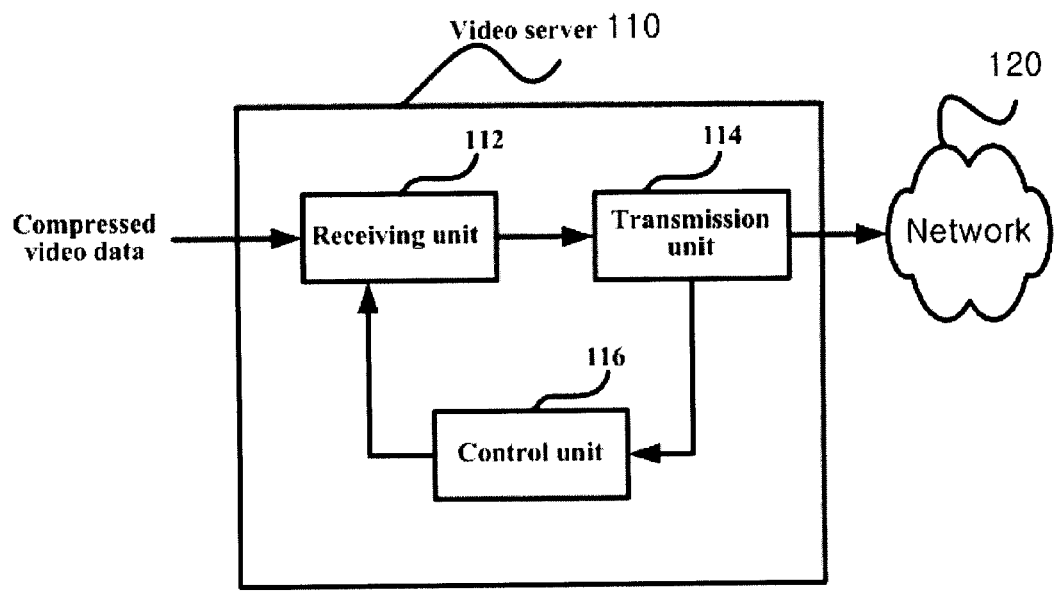
FIG. 2 is an exemplary view specifically illustrating the configuration of the video server shown in FIG. 1.
Figure 3:
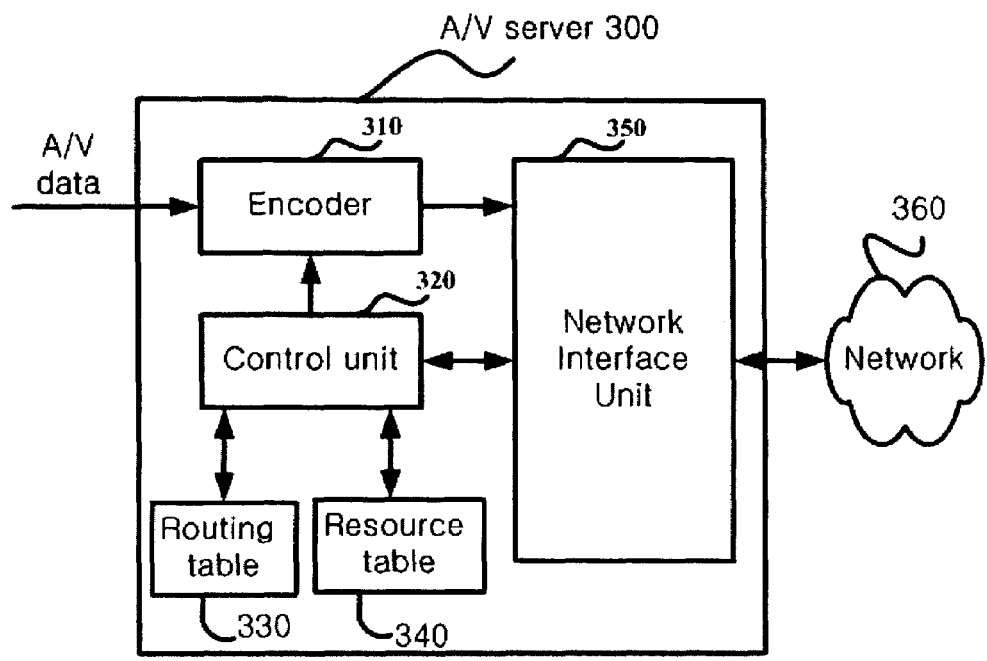
FIG. 3 is an exemplary view illustrating the configuration of a mobile ad hoc network device consistent with an embodiment of the present invention.

FIG. 3 is an exemplary view illustrating the configuration of a mobile ad hoc network device consistent with an embodiment of the present invention. An AV server 300 for providing AV data in response to a request from a client (not shown) comprises an encoder 310 for performing real-time compression of input AV data based on compression parameters; a network interface unit 350 for receiving an AV data transmission request from the client (not shown) through a network 360 and transmitting the requested AV data to the client; a routing table 330 for storing information on respective nodes present in the MANET; a resource table 340 for storing resource information by nodes present in the network; and a control unit 320 for detecting changes in the status of the network 360 using the information stored in the routing table 330 and resource table 340, determining a compression level corresponding to the detected changes in the status of the network 360 and sending a compression command to the encoder 310. The specific operation of the AV server 300 shown in FIG. 3 will be described after descriptions taken with reference to FIGS. 4 to 10.

Figure 4:
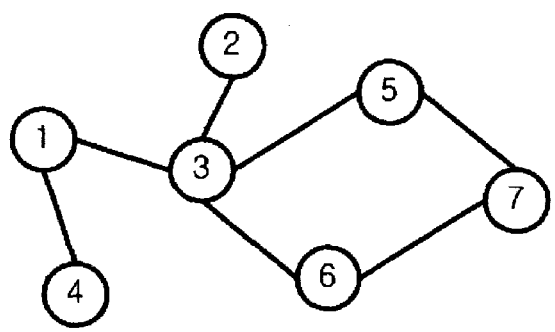
FIG. 4 is an exemplary view illustrating the configuration of nodes in a mobile ad hoc network for implementing an exemplary embodiment of the present invention.

FIG. 4 is an exemplary view illustrating the configuration of nodes in a mobile ad hoc network for implementing the present invention, wherein there is shown a MANET consisting of seven nodes. One hop is represented as a solid line connecting two nodes, and the respective nodes are named herein node-1, node-2, ..., node-7.

Figures 5, 6:
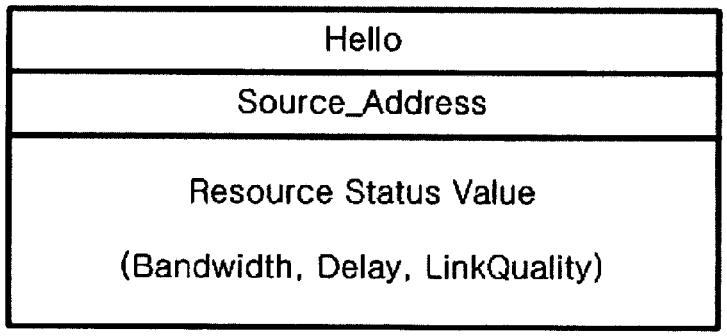
FIG. 5 is an exemplary view showing the structure of a resource table held by each of the nodes shown in FIG. 4, consistent with an embodiment of the present invention.
FIG. 6 is an exemplary view showing a modified HELLO message format consistent with an embodiment of the present invention.

FIG. 5 is an exemplary view showing the structure of a resource table held by each of the nodes shown in FIG. 4, consistent with an embodiment of the present invention. The resources may include bandwidth, time delay, link quality and the like. The transmission of resource information to each node may be achieved by using a modified HELLO packet shown in FIG. 6 and a modified topology control message shown in FIG. 7.

Since each of the nodes in the MANET environment functions as a router, it periodically exchanges the HELLO packet with just neighboring nodes. The HELLO packet generally contains routing information. The present invention may use a modified HELLO packet that contains a 'Source_Address' field indicating the address of a terminal sending a HELLO packet and a 'Resource Status Value' field indicating the resource status of the terminal.

At this time, the 'Resource Status Value' field contains information on bandwidth (Bandwidth), time delay (Delay), and link quality (LinkQuality). Since the resource information for each node is delivered using an existing HELLO packet rather than a separate packet, it is possible to share resource information without an increase in the overhead of the MANET.

Figures 7, 8:
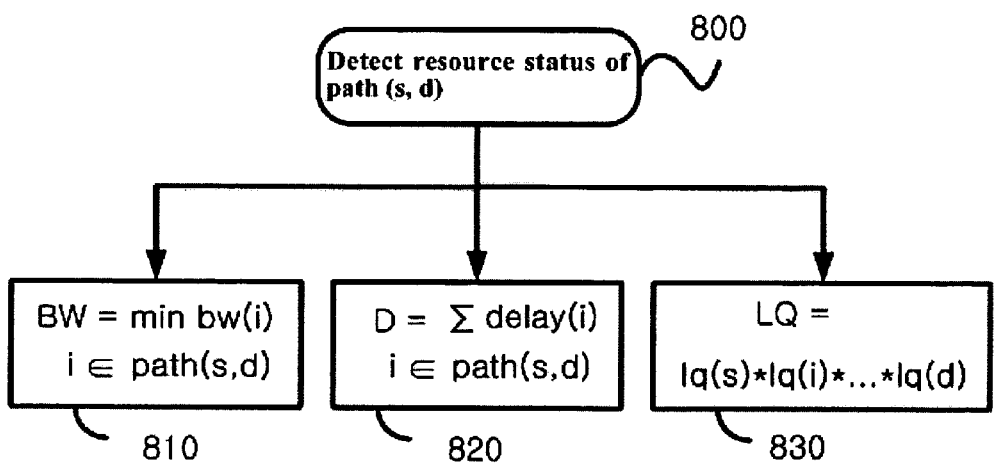
FIG. 7 is an exemplary view showing a modified topology control message format consistent with an embodiment of the present invention.
FIG. 8 is an exemplary view illustrating a method of detecting the status of resources of a transmission channel established between a multimedia data sending party and a multimedia data receiving party, consistent with an embodiment of the present invention.

Further, a node responsible for broadcasting information on the status of connection with its neighboring nodes can broadcast the routing information by using a 'topology control' message. The 'topology control' message may be transmitted while carrying information on resource status. Such a modified topology control message is shown in FIG. 7. Referring to FIG. 7, a 'Dest_Node' field denotes a target destination node, and a 'Last_Node' field denotes a final node encountered on a path through which data are transmitted from a source node to the target destination node. In addition, resources in the 'Resource Status Value' field denote resource information for a destination node. As for resource information, 'Bandwidth=100' indicates that the bandwidth is 100 kbps, 'Delay=2' indicates that a time delay is two seconds, and 'LinkQuality=0.9' indicates that a quality level of a received signal is 0.9, i.e. a quality of 90% is guaranteed.

FIG. 8 is an exemplary view illustrating a method of detecting the status of resources of a transmission channel established between a multimedia data sending party and a multimedia data receiving party, consistent with an embodiment of the present invention. The resources may include bandwidth, time delay and link quality, as described above. As for the resource status of a path (s, d) from a source node s to a target destination node d, the bandwidth (Bandwidth) of the path (s, d) is set to a minimum bandwidth of an arbitrary path i from the source node s to the destination node d (810). In addition, if there exist i paths in total on the path between the nodes s and d, the time delay (Delay) becomes the sum of time delays taken from a first path to an i-th path (820).

Further, link quality (LinkQuality) is obtained by multiplying the values of link qualities of all nodes, which pass through paths established between the source node s and the destination node d, with one another (830).

FIG. 9 is an exemplary view showing a correlation between factors of multimedia data encoding and bandwidth associated therewith. A 'FrameRate' field denotes the number of transferred frames per second, and a 'Pbetweeni' field denotes the number of p-frames following i-frames. That is, in a case of 'Pbetweeni=5,' frames are transmitted in order of i-p-p-p-p-p-i-p-p-p-p-p-i-p- . . . . Here, the i-frame and the p-frame indicate frames defined by MPEG-1 standards (officially ISO/IEC 11172) and MPEG-2 standards (officially ISO/IEC 13818). The i-frame denotes a frame independently encoded regardless of adjacent frames, whereas the p-frame denotes a frame obtained by encoding only a difference between a previous image and a current image while referring to an adjacent i-frame or p-frame. Accordingly, the p-frame has a data size much smaller than that of the i-frame. The 'Required_BW' is selected based on values of the 'FrameRate' and 'Pbetweeni' fields. For example, when 'FrameRate' is 20, a case of 'Pbetweeni'=5 requires relatively less bandwidth compared with a case of 'Pbetween'=1. The correlation shown in FIG. 9 may be implemented by either hardware or software within a terminal. Alternatively, the correlation may be managed by a separate database. Further, screen size, sampling rate and the like may be considered to calculate a required value of bandwidth.

Figure 10:
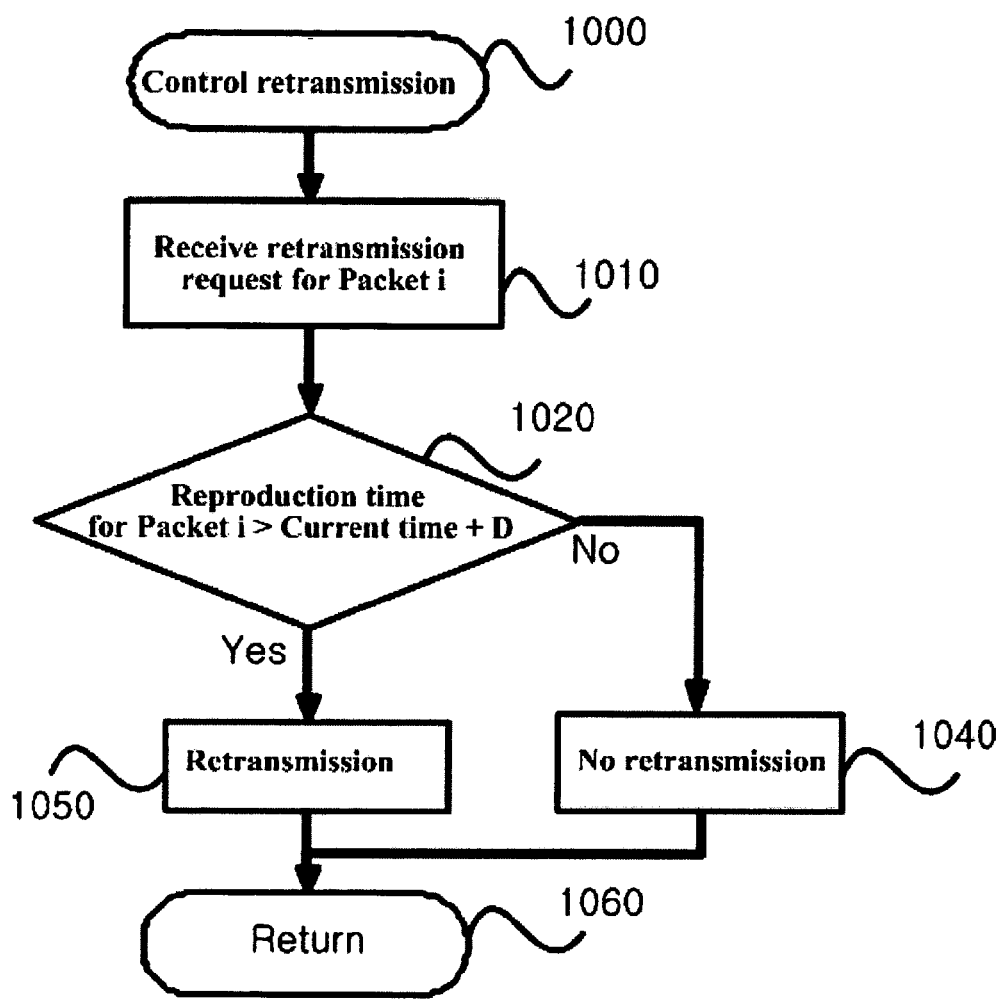
FIG. 10 is a flowchart illustrating the process of transmitting packets consistent with an embodiment of the present invention.

FIG. 10 is a flowchart illustrating the process of transmitting packets consistent with an embodiment of the present invention. Compared with a wired network, packets have higher probabilities of becoming lost or damaged due to the inherent characteristics of transmission channels in a MANET environment. Accordingly, an algorithm for packet retransmission may be considered as being indispensable. In particular, in a case where a server transmits a first i-frame and subsequently a second i-frame in real time transmission of AV data, the loss of the first i-frame may occur. Packet loss may be avoided by performing retransmission of the first i-frame resulting from the loss of the first i-frame before transmission of the second i-frame. That is, if the server receives a request for retransmission of the i-th packet (1010), the server performs addition of a current time to a resource value of time delay (Delay) associated with a client node (1020). Then, if a reproduction time for the i-th packet is larger than a value obtained through the above addition, the i-th frame is retransmitted (1050). Otherwise, the retransmission of the i-th frame is not performed (1040). Meanwhile, as for packet transmission procedures, the server may manage frames by means of a method of separately storing only transmitted packets, e.g., i-frames, operating a timer and deleting the already stored i-frames after a predefined time period.

Next, the operation of the AV server 300 shown in FIG. 3 will be described. The AV server 300 exchanges the modified HELLO packet shown in FIG. 6 and the modified topology control message shown in FIG. 7 with a client (not shown) through the network 360, more specifically, the MANET. At this time, the AV server 300 stores, in the routing table 330 thereof, node information indicating which nodes constitute paths between the AV server 300 and the client (not shown), and stores, in the resource table 340 thereof shown in FIG. 5, the resource information for the respective paths. Once the routing and resource tables 330 and 340 are established, bandwidth is determined as shown in FIG. 8. Then, it is determined whether an error-resilient module is to be operated, depending on values of the link quality (LinkQuality). Since it is an initialization process, the resources of time delay related to the determination of whether retransmission is carried out are not calculated. At this time, the error-resilient module may be included in the encoder 310 of the AV server 300 and may be a channel coding mode. That is, the encoder 310 may include a source coding module and the channel coding module, wherein the source coding module may encode raw AV data and the channel coding model may be operated only when the value of link quality is below a predetermined value.

The control unit 320 selects required bandwidth from the table shown in FIG. 9, which is in turn set as an input parameter of the encoder 310. Then, the encoder 310 compresses the raw AV data according to the selected bandwidth, and the compressed data are sent through the network interface unit 350 to a client (not shown) that has requested AV data. If a resource value of bandwidth becomes smaller while the server 300 transmits the AV data, the control unit 320 adjusts the input parameter of the encoder 310, and the encoder 310 performs an encoding task such that the bandwidth becomes smaller.

Consistent with the present invention described above, in a MANET environment, it is possible to perform more efficient resource management and AV data transmission while minimizing overhead of the network, by detecting the resource status of the network during periodic transmission and reception of the routing information and adjusting the encoding operation depending on the detected resource status.

While the present invention has been described in connection with the embodiments and the accompanying drawings, the present invention is not limited thereto since it will be apparent to those skilled in the art that various substitutions, modifications and changes may be made thereto without departing from the scope and spirit of the invention.

What is claimed is:

1. A mobile ad hoc network device, comprising:
   an encoder operable to encode multimedia data depending on predetermined network information; and
   a network interface operable to receive the network information and send the multimedia data encoded by the encoder,
   wherein the network information is received in a state where it is contained in predetermined routing messages that are periodically transmitted and received.

2. The device as claimed in claim 1, wherein the network information comprises information on bandwidth available in the mobile ad hoc network.

3. The device as claimed in claim 1, wherein the network information comprises information on link quality between a data sending node and a data receiving node in the mobile ad hoc network.

4. The device as claimed in claim 3, wherein the encoder comprises a first coding unit operable to encode the received multimedia data, and a second coding unit operable to encode the data, which have been encoded by the first coding unit, depending on the information on the link quality received through the network.

5. A mobile ad hoc network device, comprising:
an encoder operable to encode multimedia data depending on predetermined network information; and
a network interface operable to receive the network information and send the multimedia data encoded by the encoder,
further comprising a control unit operating in such a manner that upon receipt of a packet retransmission request message, the requested packet is retransmitted when a value obtained by adding a current time to a resource value of time delay of a node that has sent the message is smaller than a reproduction time for the requested packet.

6. A data transmission method in a mobile ad hoc network environment, comprising:
collecting routing information and resource information for nodes constituting a mobile ad hoc network;
determining a method of encoding multimedia data by using the collected information; and
encoding the multimedia data with the method determined when determining the method of encoding multimedia data by using the collected information, and sending the encoded multimedia data.

7. The method as claimed in claim 6, wherein collecting routing information and resource information for nodes constituting a mobile ad hoc network comprises causing the information to be contained in routing messages that are periodically transmitted and received, and extracting and collecting the information upon receipt of the routing messages.

8. The method as claimed in claim 7, wherein the information comprises information on bandwidth available in the mobile ad hoc network.

9. The method as claimed in claim 8, wherein determining a method of encoding multimedia data by using the collected information comprises making a determination such that the multimedia data can be encoded with different data compression rates depending on the bandwidth.

10. The method as claimed in claim 7, wherein the information comprises information on link quality between a data sending node and a data receiving node in the mobile ad hoc network.

11. The method as claimed in claim 10, wherein determining a method of encoding multimedia data by using the collected information comprises encoding the multimedia data, and encoding the data, which have been encoded based on the information on the link quality.

12. The method according to claim 6, further comprising upon receipt of a packet retransmission request message, retransmitting the requested packet when a value obtained by adding a current time to a resource value of time delay of a node that has sent the message is smaller than a reproduction time for the requested packet.

13. A mobile ad hoc network device, comprising:
an encoder operable to encode multimedia data depending on predetermined network information; and
a network interface operable to receive the network information and send the multimedia data encoded by the encoder,
wherein an audio and video (AV) data server includes the encoder and the network interface, and
wherein said AV data server further comprises a routing table which stores information on nodes present in the mobile ad hoc network and a resource table which stores resource information according to the nodes present in the mobile ad hoc network.

* * * * *